Jan. 19, 1926.  1,570,024
A. C. WOOD ET AL
DIRIGIBLE SEARCHLIGHT
Filed Sept. 24, 1923   2 Sheets-Sheet 1
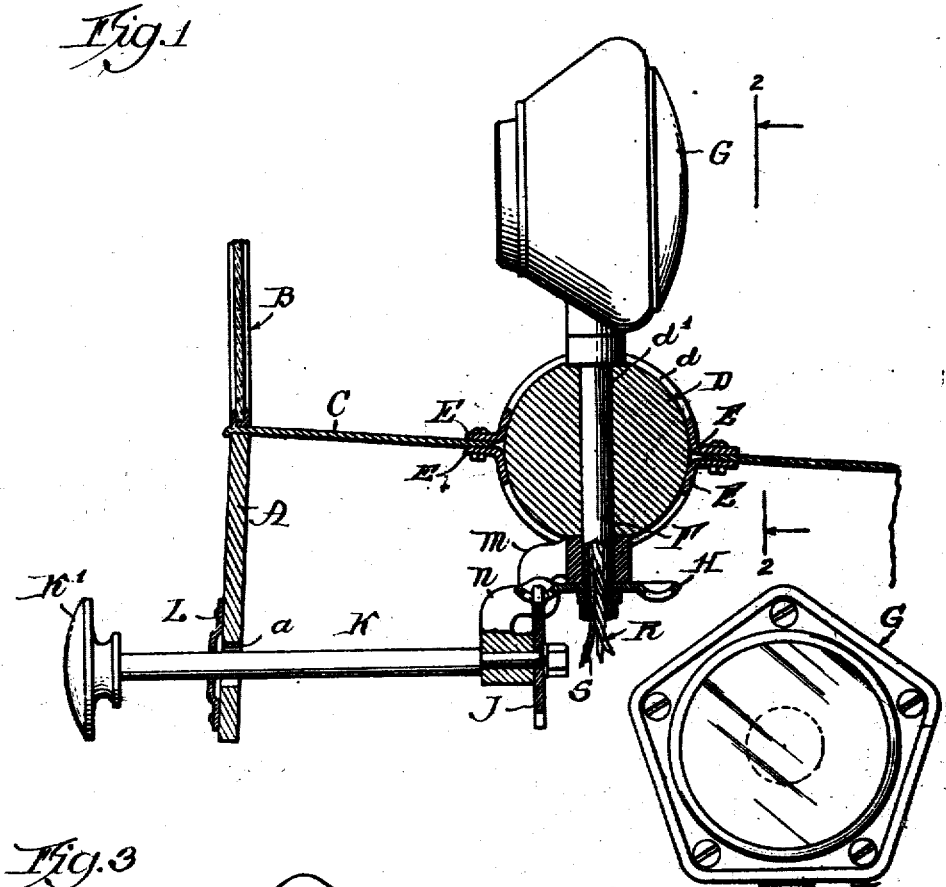
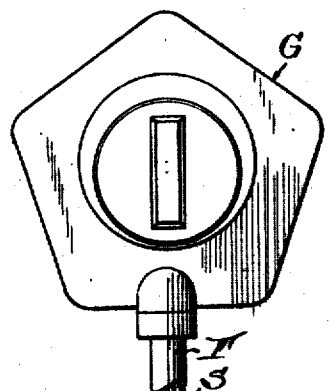
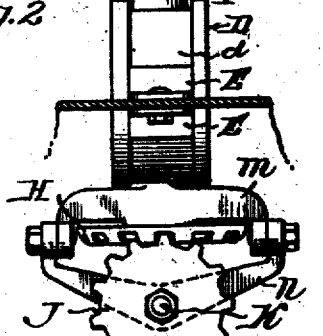

Jan. 19, 1926.  1,570,024
A. C. WOOD ET AL
DIRIGIBLE SEARCHLIGHT
Filed Sept. 24, 1923    2 Sheets-Sheet 2
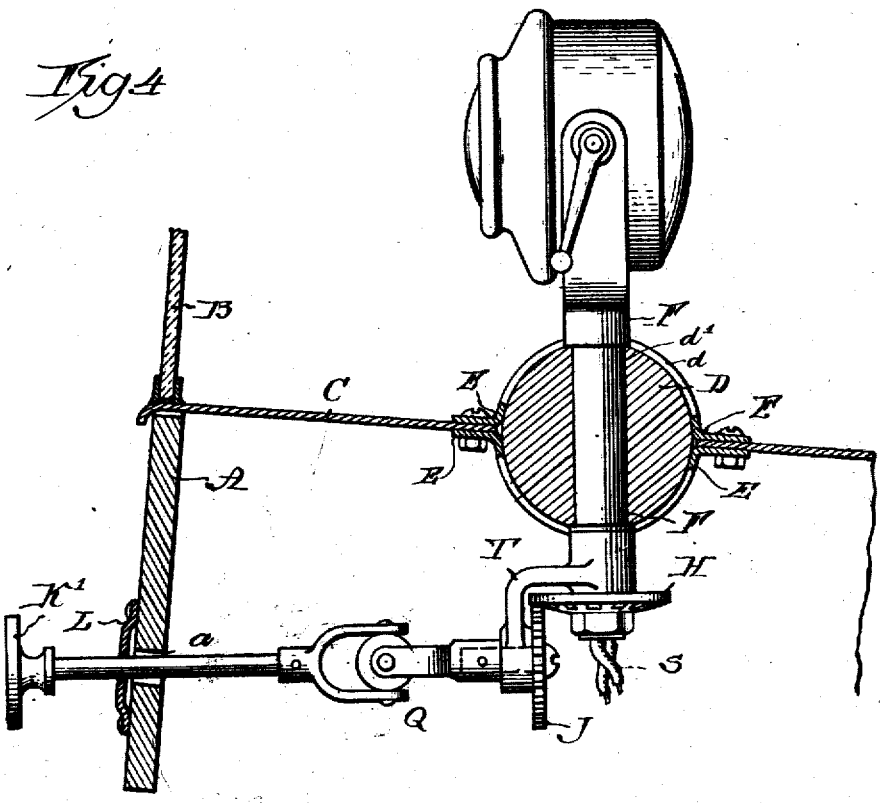
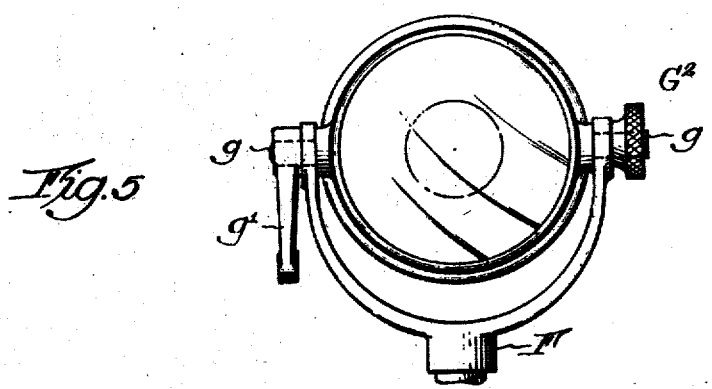

Patented Jan. 19, 1926.

1,570,024

UNITED STATES PATENT OFFICE.

ANDREW C. WOOD AND LEO L. MEYERS, OF CHICAGO, ILLINOIS, ASSIGNORS TO STEWART-WARNER SPEEDOMETER CORPORATION, OF CHICAGO, ILLINOIS, A CORPORATION OF VIRGINIA.

DIRIGIBLE SEARCHLIGHT.

Application filed September 24, 1923. Serial No. 664,362.

*To all whom it may concern:*

Be it known that we, ANDREW C. WOOD and LEO L. MEYERS, both citizens of the United States, having residence in the city of Chicago, in the county of Cook and the State of Illinois, have invented certain new and useful Improvements in Dirigible Searchlights, of which the following is a specification, reference being had to the accompanying drawings, forming a part thereof.

The purpose of this invention is to provide an improved construction of mounting and means of adjusting a dirigible searchlight upon a motor vehicle. It consists in the elements and features of construction shown and described as indicated in the claims.

In the drawings:—

Figure 1 is a fore-and-aft vertical section through the dash and cowl in front of the dash of an automobile equipped with this invention, section being axial with respect to the searchlight stem and operating connections for adjusting the searchlight.

Figure 2 is a section at the line, 2—2, on Figure 1, looking toward the searchlight and the operating gears.

Figure 3 is a view of the rear temperature signal side of the searchlight.

Figure 4 is a view similar to Figure 1, showing a modification.

Figure 5 is a partial front elevation showing forked bracket of lamp.

In the structure shown in the drawings A represents the dash of the motor vehicle; B the windshield and C the cowl extending in front of the dash and windshield. In the cowl there is mounted a circular plate or disk, D, having a peripheral groove, $d$, which serves for mounting it in the cowl by means of clips, E E, E, E, which are bolted to the cowl at the forward and rear ends of the aperture made in the cowl for admitting the plate, D. The plate, D, has a diametric aperture, $d$, which adapts it to constitute the journal bearing of the stem, F, of the searchlight member, G. At the lower end of the stem, F, it carries a gear, H, meshing with a gear, J, on the forward end of an operating shaft, K, which extends through the dash at an aperture, $a$, therein and obtains support at the rear side of the dash in a plate, L, secured to the dash and having an aperture for said shaft, K, in which the same may have limited angular movement by reason of the shaft being fitted loosely in said aperture. For maintaining the two gears, H and J, in mesh journal bearings for the lower end of the stem, F, and the forward end of the shaft, K, are provided in bracket members, M and N, which are pivoted together at a line tangent to the pitch circles of the two gears. This familiar form of connection for maintaining two gears in mesh with each other at a variable angle, may be carried out in detail in any familiar manner.

From the foregoing description it will be understood that the operator sitting behind the dash may adjust the searchlight as to its tilt in vertical plane, by longitudinal thrust or pull of the shaft, K, for which manipulation it is provided with a knob or handle, $K^1$, and it will be understood that by rotating its shaft at any position of its longitudinal adjustment for tilt of the lamp, the lamp will be rotated about its stem, F, for its horizontal adjustment to cause its beam to be thrust to one side or the other of the road, or directly ahead.

In the construction shown in Fig. 1, the searchlight hereinabove referred to as the lamp is formed in conjunction with a familiar form of engine temperature indicating device, the searchlight and the temperature indicator constituting a single unit structurally, the searchlight being at the forward side as seen in Fig. 2, and the temperature indicating devices at the rear side of this unit as seen in Fig. 3. For connecting the circuit wires for energizing both the searchlight and the temperature signals, the stem, F, is hollow as indicated in Figure 2, and the circuit wires, R and S, for the searchlight and signal respectively, are both extended through the hollow stem.

In Figure 4 there is represented a modification of the invention. In this modification the searchlight alone is carried at the upper end of the stem and preferably, as shown, the stem is forked for clasping the searchlight and having the latter pivoted between its fork ends by means of horizontally-projecting trunnions, $g$, either of which may be provided with a crank arm, $g^1$, for attachment of any desired connection for tilting the lamp in the trunnion bearings, the opposite trunnion being threaded and provided with a nut, G², which may be screwed up against the fork arm for securing the lamp in the vertical angular position to which it may be adjusted for the purpose of directing its beam at all times downward to the roadway rather than horizontally, in accordance with statutory requirements in certain localities. In this modification, instead of the journal bearing members for the lamp stem and operating shaft pivoted together as described in respect to the construction shown in Figure 1, a single angle-shaped bracket, T, affords journal bearings for both the lamp stem and operating shaft, and this bracket is connected for actuation by the thrust and pull of the operating shaft by having said shaft provided with a universal joint as shown at Q which permits the rotation of the shaft for rotating the two intermeshing gears, notwithstanding the two parts of the shaft connected at said universal joint may be at an angle to each other by reason of the shaft having been thrust or pulled longitudinally to tilt the lamp vertically by turning the plate E, in a vertical plane in its bearings in the cowl.

We claim:—

1. A dirigible headlight for a motor vehicle, comprising in combination with a dash and cowl of the vehicle a circular plate mounted in the cowl for rotation in a vertical fore-and-aft plane; a searchlight support comprising a stem journaled in said plate transversely to the axis thereof, and extending through the plate transversely to the cowl; a gear on the lower end of said stem below the cowl and plate; a rotatable and longitudinally movable operating shaft extending through the dash and having at its forward end a gear meshing with the gear on the lamp stem, and journal bearing means for the lower end of the lamp stem and forward end of the operating shaft, adapted for holding in mesh the gears on said shafts respectively; the parts having a joint between the lower journal bearing of the lamp stem and the slide bearing of the operating stem in the dash for accommodating change of angle between the two shafts resultant from longitudinal adjustment of the operating shaft.

2. In the construction defined in claim 1, foregoing, the plate being mounted by its periphery for rotation in the cowl.

3. In the construction defined in claim 1, foregoing, the proximate journal bearings of the intermeshing gears on the lamp stem and operating shaft respectively being pivoted together at a line tangent to the pitch circles of the two gears at their point of tangency.

4. A dirigible searchlight for a motor vehicle, comprising in combination with the dash and the cowl in front of the dash, a plate mounted in the cowl for rotation in a vertical fore-and-aft plane, a lamp body having a stem in said plate journaled transversely of the plate and the cowl; an operating spindle extending rotatably and slidably through the dash and intermeshing gears on said spindle and stem respectively; journal bearings of the spindle and stem proximate to said gears respectively, pivotally connected for keeping the gears in mesh throughout limited angular movement of the stem and spindle.

In testimony whereof, we have hereunto set our hands at Chicago, Illinois, this 20th day of September, 1923.

ANDREW C. WOOD.
LEO L. MEYERS.